Jan. 23, 1951 V. SYNEK 2,538,987
SEALING DEVICE
Filed Aug. 18, 1948

Inventor
Viktor Synek
by his Attorneys
Howson & Howson

Patented Jan. 23, 1951

2,538,987

UNITED STATES PATENT OFFICE 2,538,987

SEALING DEVICE

Viktor Synek, Goteborg, Sweden, assignor to Aktiebolaget Svenska Kullagerfabriken, Goteborg, Sweden, a corporation of Sweden Application August 18, 1948, Serial No. 44,945
In Sweden September 6, 1947

4 Claims. (Cl. 286—11)

The present invention relates to sealing devices for sealing the annular space between the walls of a chamber and a shaft protruding therefrom and has for its purpose to provide a sealing device which is effective, but which requires very little space especially in the axial direction of the shaft and in which the component parts are protected from damage.

Figure 1:
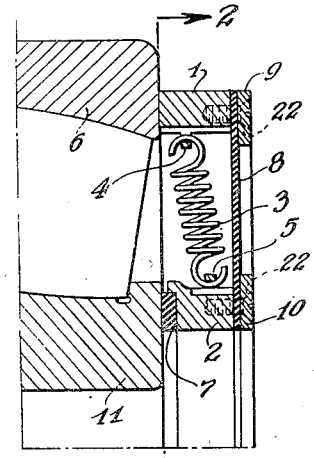
Figure 2:
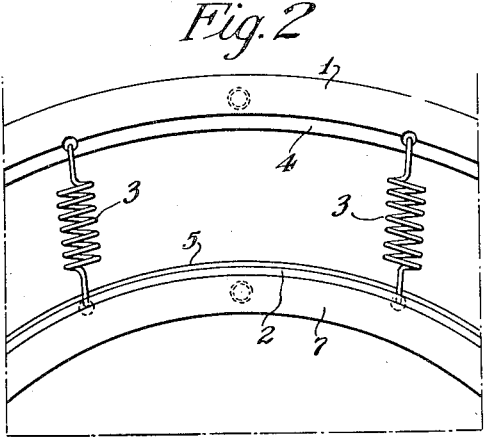
Figure 3:
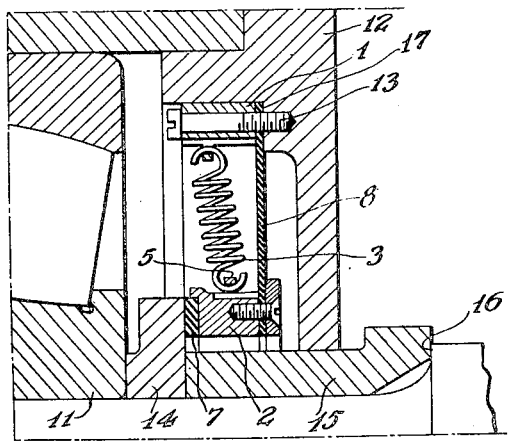
Figure 4:
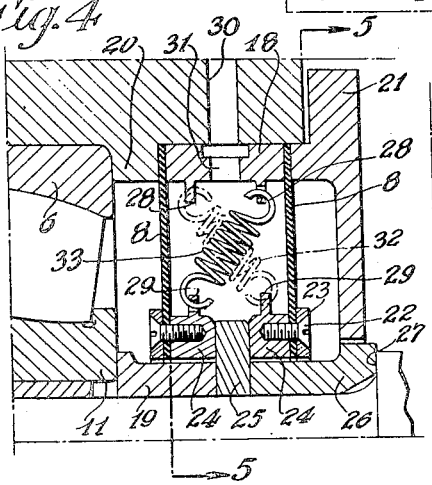
Figure 5:
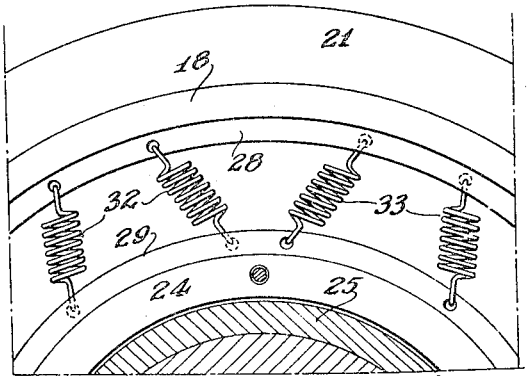

Several forms of the invention are illustrated on the accompanying drawings in which Fig. 1 is a section through a seal having a single sealing surface and attached to a roller bearing. Fig. 2 shows a face view of a portion of the seal. Fig. 3 is a section through a seal mounted in a bearing housing. Fig. 4 is a section through a seal having two sealing surfaces and Fig. 5 shows a face view of a portion of a seal according to Fig. 4.

The seal according to Fig. 1 comprises an outer ring 1 and an inner ring 2, which are connected by a number of tension springs 3 located around the circumference and attached to an internal flange 4 in the ring 1 and to an external flange 5 on the ring 2 respectively. When in mounted position the springs are stretched so that they are under tension. The ring 1 is attached to the outer ring 6 of the bearing in some suitable manner. The inner ring 2 is provided on the side adjacent to the bearing with a sliding ring 7 of some material having a low coefficient of friction when sliding on steel, for instance bronze or the like. An annular plate 8 of some flexible and preferably elastic material, for instance sheet rubber or the like, is fixed to the outer plane surfaces of the rings 1 and 2 by means of rings 9 and 10 respectively which are connected to the rings 1 and 2 in some suitable manner, for instance by means of screws 22. The plate 8 thus closes the opening between the rings 1 and 2. The flanges 4 and 5 are so positioned relative to each other that when the seal has been mounted the springs ar forced to assume an oblique position so that the ring 7 is pressed against the inner ring 11 of the bearing with a force depending on the amount of obliquity of the springs and their tension.

As will be apparent from Fig. 2 the springs are also obliquely positioned in the peripheral direction and are suitably arranged so that they are alternately turned toward the direction of rotation and away from the direction of rotation. In this way the greatest possible stability in the peripheral direction is obtained, since a relatively small peripheral displacement is counteracted by the tension in those springs in which the tension is increased while at the same time the tension is decreased in the other springs. The suitable spring tension and stabilizing force for a given spring may be obtained by suitably locating the holes in which the springs are attached, whereby the obliquity and length of the springs under tension are changed.

Each spring gives rise to a component force in the axial direction which creates a sealing pressure, a component force in the radial direction which keeps the rings 1 and 2 concentric with each other and a component force in the peripheral direction which increases the stability of the rings relative to each other in the peripheral direction.

In the form of the invention shown in Fig. 3 the seal is mounted in a bearing housing. The outer ring 1 and the outer edge of the plate 8 are in this case fixed in the housing cover 12 by means of screws 13. The sliding ring 7 slides against a ring 14 which is held between the inner ring 11 of the bearing and a distance sleeve 15 which engages a shoulder 16 on the shaft. The axial distance between the sliding surface of the ring 14 and the locating plane 17 of the housing cover is preferably so chosen that the inside plane surface of the ring 1 and the sliding surface of the sliding ring 7 are located in the same plane as shown in the figure. The adjusting capacity of the seal is however so great that divergence from this position does not affect its function.

The seal according to Fig. 4 has two sealing surfaces but does not differ in principle from the seals described above.

At each side of the outer ring 18 is located a flexible annular plate 8. The ring 18 and the plates 8 are fixed between a flange 20 in the housing and the housing cover 21. The inner edges of the plates 8 are fixed to sliding rings 24 by means of screws 22 and rings 23. A sealing ring 25 is located between the rings 24 and is fixed between a distance sleeve 26 abutting against a shoulder 27 on the axle and another distance sleeve 19 which abuts against the inner ring 11 of the bearing. The outer ring 18 of the seal is provided internally with two flanges 28. Each of the sliding rings 24 is provided externally with a flange 29. In this case the springs are arranged so that every other pair of springs 32, of which one leans in the direction of rotation and the other in the opposite direction is attached to the left hand flange 28 and the right hand flange 29 and every other pair 33 between the right hand flange 28 and the left hand flange 29. Thus the sliding rings 24 are pressed against the sealing ring 25 and the whole system is maintained in equilibrium. A channel 30 is provided in the housing and is in communication with an opening 31 in the ring 18 whereby the seal may be filled with lubricant for lubricating the sliding surfaces between the rings 24 and the sealing ring 25.

In all the forms of the invention described above the springs are located inside of the annular plate 8 where they are protected from accidental blows and from rust.

If desired the seal may be arranged for sliding to take place at the outer ring of the bearing instead of at the inner ring as shown.

Having thus described my invention I claim and desire to secure by Letters Patent the following:

1. A sealing device for sealing the annular space between the walls of a chamber and a shaft protruding therefrom comprising an inner ring, an outer ring located radially outside of and surrounding said inner ring, an annular flexible plate closing the space between the said rings, a plurality of springs stretched between the said rings and obliquely across their axial dimensions, the said springs being located at the inner side of the said annular plate and within the space defined by said rings and said plate.

2. A sealing device for sealing the annular space between the walls of a chamber and a shaft protruding therefrom comprising an outer ring, an inner ring, an annular flexible plate closing the space between said rings, a plurality of springs stretched under tension between the said rings, some of said springs leaning in one direction relative to the circumferential direction and some of said springs leaning in the other direction relative to the circumferential direction.

3. A sealing device for sealing the annular space between the walls of a chamber and a shaft protruding therefrom comprising an outer ring, a pair of inner rings, an annular flexible plate closing the space between each of said inner rings and the outer ring, a plurality of springs stretched under tension between each of said inner rings and the opposite side of the said outer ring and located between the annular plates.

4. A sealing device for sealing the annular space between the walls of a chamber and a shaft protruding therefrom comprising inner and outer ring elements radially spaced and disposed one within another, at least one annular flexible plate closing the space between the said ring elements, and a plurality of springs stretched between the said ring elements and obliquely with respect to the axial dimensions thereof and within the annular space defined by said elements.

VIKTOR SYNEK.

REFERENCES CITED

The following references are of record in the file of this patent:

UNITED STATES PATENTS

| Number | Name | Date |
| --- | --- | --- |
| 1,170,450 | Lachmann | Feb. 1, 1916 |
| 1,498,917 | Hutchens | June 24, 1924 |
| 1,797,735 | Spreen | Mar. 24, 1931 |